United States Patent
Katoh et al.

(10) Patent No.: US 8,031,466 B2
(45) Date of Patent: *Oct. 4, 2011

(54) THERMAL MANAGEMENT OF A PERSONAL COMPUTING APPARATUS

(75) Inventors: Takayuki Katoh, Kanagawa (JP);
Atsushu Miyashita, Kanagawa (JP);
Mitsuhiro Yamazaki, Yokohama (JP);
Hiroyuki Uchida, Kanagawa-ken (JP);
Susumu Shimotono, Kanagawa-ken (JP); Mizuho Tadokoro, Kanagawa-ken (JP)

(73) Assignee: Lenovo (Singapore) Pte Ltd., Singapore (SG)

( * ) Notice: Subject to any disclaimer, the term of this patent is extended or adjusted under 35 U.S.C. 154(b) by 579 days.

This patent is subject to a terminal disclaimer.

(21) Appl. No.: 11/928,223

(22) Filed: Oct. 30, 2007

(65) Prior Publication Data
US 2008/0059004 A1    Mar. 6, 2008

Related U.S. Application Data

(63) Continuation of application No. 11/032,726, filed on Jan. 11, 2005, now Pat. No. 7,412,306.

(51) Int. Cl.
*G06F 1/16* (2006.01)
*H05K 5/00* (2006.01)
*H05K 7/00* (2006.01)
*H05K 7/20* (2006.01)
*G06F 1/20* (2006.01)
*G06F 1/26* (2006.01)
*G06F 1/32* (2006.01)
*G05D 23/00* (2006.01)
*G01K 1/08* (2006.01)

(52) U.S. Cl. .............. 361/679.55; 361/679.46; 361/688; 700/300; 702/132; 713/320

(58) Field of Classification Search .................. 700/299, 700/300; 702/130, 132, 136; 713/100, 320, 713/322, 300; 361/679.01, 679.02, 679.46–679.48, 361/679.55, 688–690, 694, 695
See application file for complete search history.

(56) References Cited

U.S. PATENT DOCUMENTS 5,590,061 A * 12/1996 Hollowell, II et al. ........ 702/130
(Continued)

FOREIGN PATENT DOCUMENTS

JP    07-334263    12/1995
(Continued)

OTHER PUBLICATIONS

Kitamura et al., "Study on Chimney Effect on Natural Air Cooling of Electronic Equipment under Inclination", The Ninth Inter Society Conference on Thermal and Thermomechanical Phenomena in Electronic Systems, Jun. 1-4, 2004, vol. 1, pp. 121-127.*

*Primary Examiner* — Crystal J Barnes-Bullock
(74) *Attorney, Agent, or Firm* — Lieberman & Brandsdorfer, LLC

(57) ABSTRACT

A method and system are provided for thermal management of a portable computing apparatus. Accelerometers are provided to detect changes in attitude, and temperature sensors are provided to detect changes in temperature. A fan is used to cool the internal temperature of the electronic components of the computer. In response to lift of the computer from a stationary surface, the computer may transition to an alternative state of operation. The transition may include the change of the speed of the fan and/or adjustment of the processor clock.

18 Claims, 6 Drawing Sheets

U.S. PATENT DOCUMENTS

| | | | |
|---|---|---|---|
| 5,835,077 A * | 11/1998 | Dao et al. | 345/157 |
| 6,082,623 A | 7/2000 | Chang | |
| 6,243,656 B1 * | 6/2001 | Arai et al. | 702/132 |
| 6,256,193 B1 * | 7/2001 | Janik et al. | 361/679.59 |
| 6,470,289 B1 * | 10/2002 | Peters et al. | 702/132 |
| 6,601,168 B1 * | 7/2003 | Stancil et al. | 713/100 |
| 6,608,566 B1 * | 8/2003 | Davis | 340/870.11 |
| 6,661,655 B2 | 12/2003 | Yin | |
| 6,717,808 B2 * | 4/2004 | Ueda et al. | 361/695 |
| 6,721,738 B2 * | 4/2004 | Verplaetse et al. | 700/237 |
| 6,738,256 B2 * | 5/2004 | Hsieh et al. | 361/679.47 |
| 6,760,649 B2 | 7/2004 | Cohen | |
| 6,845,008 B2 * | 1/2005 | Pokharna et al. | 361/690 |
| 6,956,564 B1 * | 10/2005 | Williams | 345/179 |
| 6,988,048 B2 * | 1/2006 | Lin | 702/132 |
| 7,137,015 B2 * | 11/2006 | Su | 713/300 |
| 7,272,732 B2 * | 9/2007 | Farkas et al. | 713/320 |
| 7,308,587 B2 * | 12/2007 | Inui et al. | 713/310 |
| 7,451,332 B2 * | 11/2008 | Culbert et al. | 713/320 |
| 7,793,291 B2 * | 9/2010 | Arai et al. | 718/100 |
| 2003/0154291 A1 * | 8/2003 | Ocheltree et al. | 709/228 |
| 2003/0177402 A1 | 9/2003 | Piazza | |
| 2004/0060687 A1 * | 4/2004 | Moss, II | 165/80.3 |
| 2005/0216221 A1 * | 9/2005 | Broyles et al. | 702/132 |
| 2006/0017692 A1 * | 1/2006 | Wehrenberg et al. | 345/156 |
| 2006/0193113 A1 * | 8/2006 | Cohen et al. | 361/687 |

FOREIGN PATENT DOCUMENTS

| | | |
|---|---|---|
| JP | 08-328698 | 12/1996 |
| JP | 2000-242369 | 9/2000 |
| KR | 2001-0011151 | 2/2001 |
| KR | 2006055135 A * | 5/2006 |

\* cited by examiner

THERMAL MANAGEMENT OF A PERSONAL COMPUTING APPARATUS

CROSS REFERENCE TO RELATED APPLICATION(S)

This application is a continuation of application Ser. No. 11/032,726, filed on Jan. 11, 2005, now U.S. Pat. No. 7,412,306, which is hereby incorporated herein by reference.

BACKGROUND OF THE INVENTION

1. Technical Field

This invention relates to thermal management of a personal computer. More specifically, the thermal management applies to detection of movement of a personal computer from a stationary surface and managing cooling of heat generating components in response to the movement.

2. Description Of The Prior Art

It is known in the art that electronic parts in computer systems generate heat. Fans and heat sinks have been developed to manage heat dissipation of electronic parts. Laptop computers are a category of personal computers that are relatively compact and, as such, are portable. However, problems arise when a user of a laptop computer moves the laptop from a stationary position on a stationary surface, to their lap or another part of their body. The problems that arise are found in excess heat reaching the surface of the body of the user through a base surface of the computer, which can cause discomfort. Accordingly, there is a need to accurately detect movement from a stationary surface and to efficiently dissipate heat from the computer components so that a user of the laptop will not suffer discomfort.

There are several patents that address thermal management of a laptop computer. For example, U.S. Pat. No. 6,760,649 to Cohen provides a pressure sensor on a base cover of a laptop computer to determine whether the base surface of the laptop is in direct contact with a lap of the user and to initiate a cooling function in response to activation of the pressure sensor. When the laptop is on a stationary surface, the pressure sensor does not become activated since the sensor has consideration for a gap frequently formed between the base surface of a laptop casing and a resting surface, such as a stationary surface. As such, the pressure sensor does not activate on a stationary surface. However, there are limitations associated with the '649 patent to Cohen. For example, an erroneous determination may arise when the user of the laptop is not in direct contact with the base surface of the casing. One such example is if an object becomes caught between the casing and stationary surface, or an edge of the stationary surface is detected as a lap when a portion of the casing is placed into a position to jut out from the stationary surface without support. Activation of the sensor results in initiation of cooling measures, which in turn results in an increase in fan noise and may result in lowering the frequency of the processor clock. Cooling measures which lower the frequency of the processor clock affect the performance of the personal computer. If the cooling measures are initiated in response to a false reading of a sensor, then the personal computer may inappropriately operate at a lower performance level. Accordingly, the prior art does not address the need for an accurate tool for detecting movement of a laptop from a stationary surface.

Therefore, there is a need for an accurate method of determining when a laptop computer has been moved from a stationary surface to a lap of a user or other part of the body. The method should include the entire surface area of the base surface of the laptop, and restrictively respond to the movement with a minimal thermal management adjustment so that the adjustment should not interfere with internal or external operations of the computer.

SUMMARY OF THE INVENTION

This invention comprises a method, system, and article for thermally managing a personal computer subject to movement from a stationary position.

In one aspect, a method is provided for cooling a portable computing apparatus. Movement of the computer from a stationary surface is detected. The detected movement includes a change in inclination of the computer casing. It is then determined if a target temperature has been exceeded in response to the detected movement. If it is determined that the target temperature has been exceeded, the computer transitions to an alternative cooling state.

In another aspect of the invention, a portable computing apparatus is provided. The portable computing apparatus includes a detector to sense tilt movement of the computer from a surface. A sensor is also provided to determine if a target temperature has been exceeded in response to the detected movement. If the determination is positive, a controller transitions the computer to an alternative cooling state.

In yet another aspect of the invention, an article is provides with means to detect a lift movement of a computer from a stationary surface. Means are also provided to determine if a target temperature has been exceeded in response to the detected movement, and to transition the computer to an alternative cooling state in response to a positive determination.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

One or more temperature sensors are provided to detect an internal operating temperature of a computer, and one or more accelerometers are provided to determine a change in attitude of the computer. In addition, one or more fans are placed inside the casing of the computer to manage thermal output of electronic components therein. The temperature sensors and accelerometers function together with associated logic to balance performance of the computer while mitigating the casing surface temperature of the computer. At such time as a change in attitude of the computer is detected, an operational mode of the computer may be adjusted to quickly cool the casing surface temperature so that a user of the laptop would not be discomforted by a high surface casing temperature.

Technical Details

Figure 1:
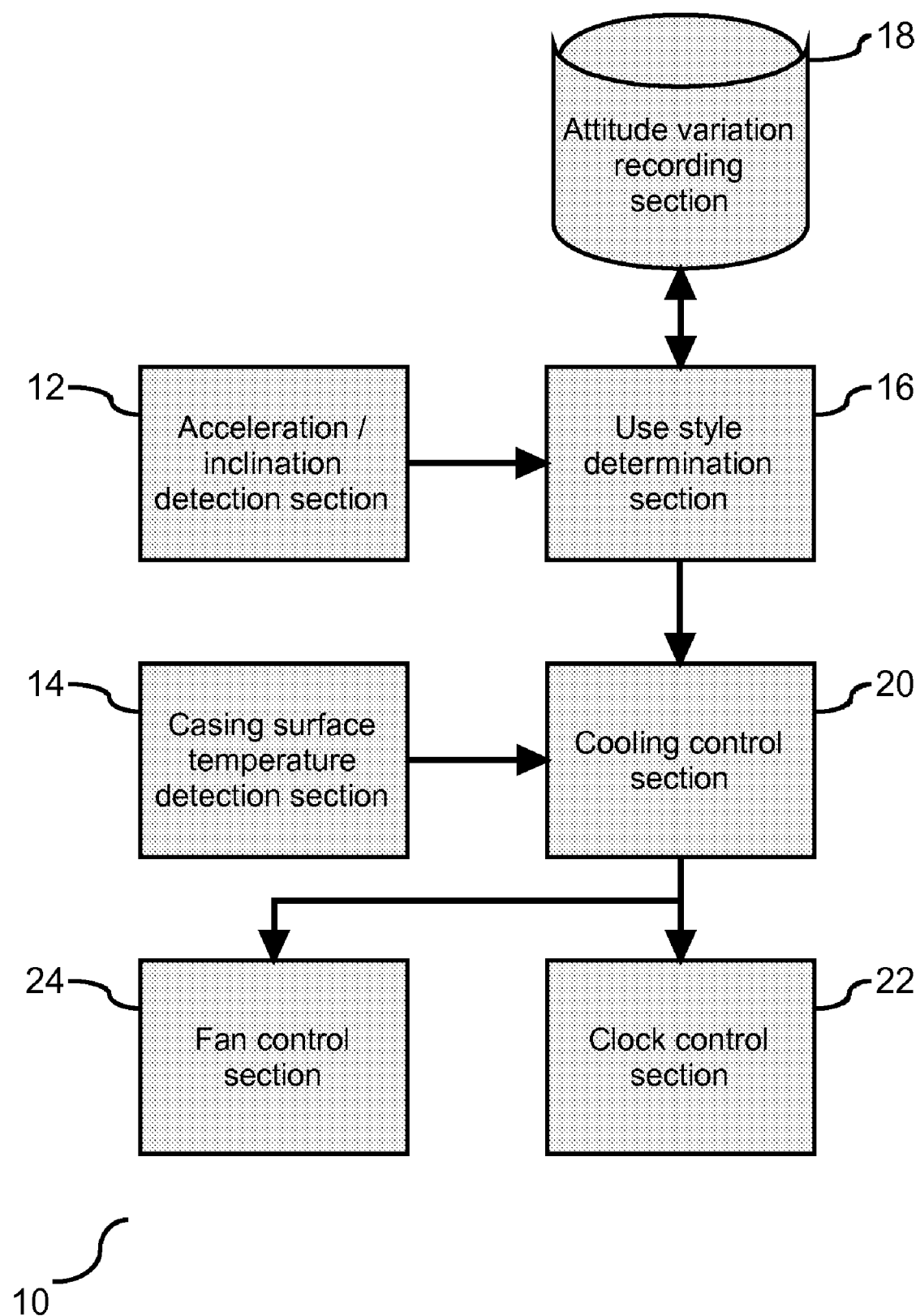
FIG. 1 is a block diagram of internal sensors and thermal management components of the computer according to the preferred embodiment of this invention, and is suggested for printing on the first page of the issued patent.

FIG. 1 is a block diagram (10) of internal components of a portable computing apparatus, such as a laptop, and the elements therein that control operation and performance of the computer. As shown, there is an acceleration section (12) which includes accelerometers to detect acceleration of the personal computer in relation to detecting a change in inclination, and a casing surface temperature detection section (14), which includes one or more temperature sensor(s) to detect the surface of the casing. The acceleration section (12) is in communication with a use style determination section (16), which is in communication with an attitude variation recording section (18). The use style determination section ascertains the preferred mode of use of the computer in response to data received by the acceleration section (12) and data stored in the attitude variation recording section (18). The attitude variation recording section (18) stores data variations received from the accelerometer at predetermined time intervals and compares them to a record of variations in an earlier time period. Based upon comparisons of acceleration data, a style of use of the laptop may be ascertained. The result of this determination is one of style of use in which a user is probable to have direct contact with the casing surface and a style in which a user is not likely to have direct contact with the casing surface. The determination results are communicated to a cooling control section (20) which provides thermal management to the laptop computer. The time intervals at which determination results are sent from the determination section to the cooling control section are preferably set to coincide with the intervals at which acceleration and inclination data are sent from associated accelerometers to the use style determination section (16). In one embodiment, the frequency in which the determination results are forwarded to the cooling section may be adjusted. In addition, obtained surface temperature values are supplied from a casing surface at predefined time intervals. Based on a combination of the surface temperature and the determination results from the user style determination section (16), the cooling control section issues a cooling request to a clock control section (22) and/or a fan control section (24) as required each time the casing surface temperature reaches an upper style limit. In one embodiment, one of the control sections, i.e. clock and fan, to which the adjustment request will be sent is selected with priority of adjustment. Accordingly, accelerometers and temperature sensor data are obtained to determine an optimal thermal management mode.

In one embodiment, the use style determination section and the attitude variation section communicate with a device driver in response to a determination that there has been an attitude adjustment. The comparison of attitude data contributes to providing an accurate determination of changes in attitude of the laptop computer. If the attitude variation recording section (18) provides data of a significant change in attitude, the device driver transmits a communication to the cooling control section (20). In one embodiment, the cooling control section (20) communicates with the BIOS which supports control of the processor clock and fan speed. The clock control section supports a change in the clock of the processor, i.e. a greater clock speed results in a greater thermal output. Similarly, the fan control section provides support for adjustment of the speed of the fans, which may need to be increased to provide greater cooling capacity. Accordingly, data gathered from the accelerometer(s) together with the temperature sensor(s) are used to communicate external data to a device driver in communication with BIOS through a program manager utility to provide adjustments to the fan and/or processor to enhance cooling.

Figure 2A:
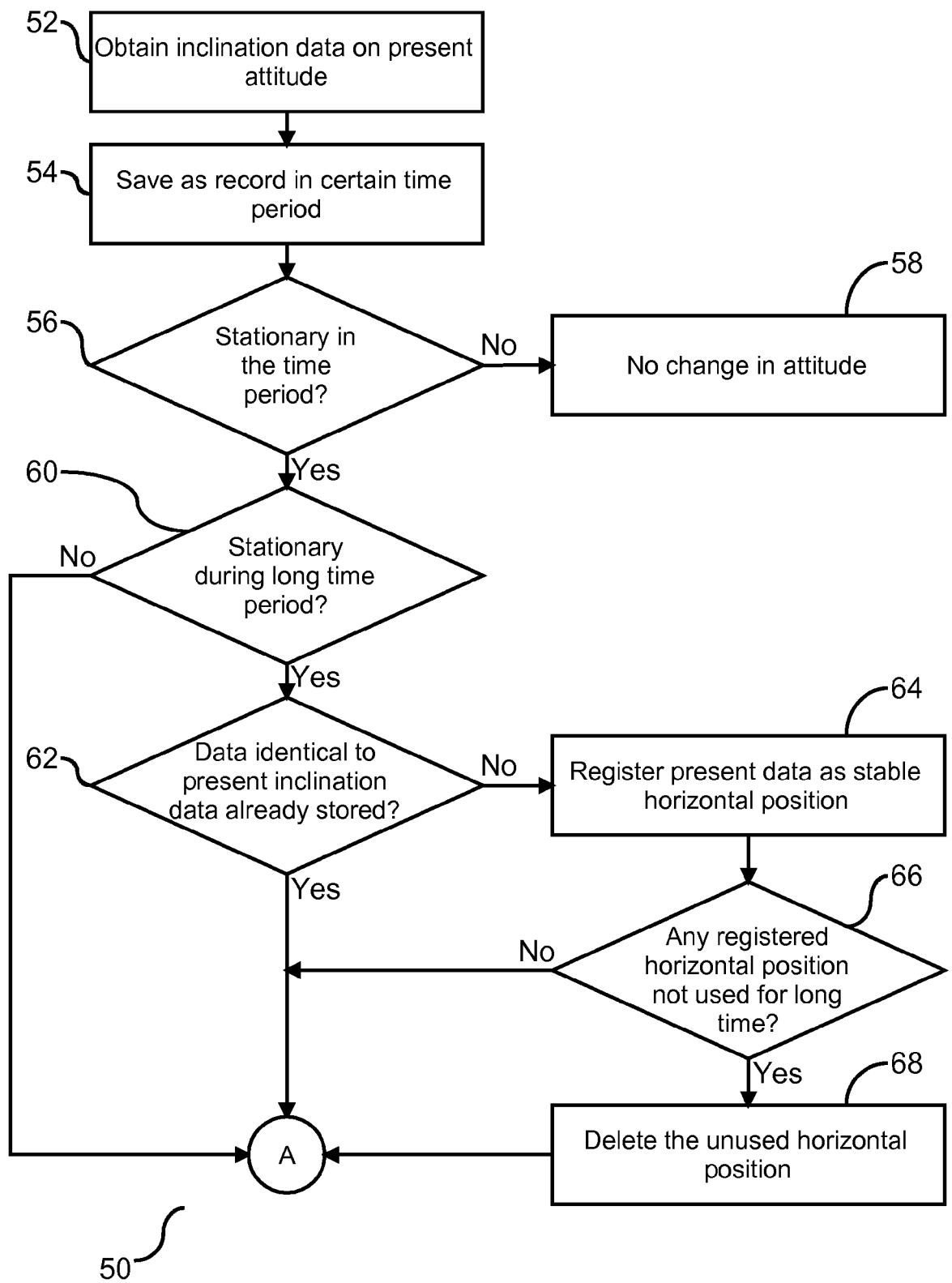
FIGS. 2a and 2b are flow charts illustrating a process for determining a change in attitude of the computer.

As shown in FIG. 1, the casing of the laptop computer includes one or more accelerometers to detect a change in attitude of the computer. FIG. 2a is a flow chart (50) illustrating a process for processing and managing data received from the accelerometers. Inclination data is obtained on the present attitude of the casing (52), and the data in association with the time period in which it was obtained is saved as a record (54). Thereafter, a test is conducted to determine if the laptop computer was stationary during the time period in which the inclination data was obtained (56). In one embodiment, inclination data may be obtained in 20 second intervals, although such time intervals may be adjusted to be increased or decreased. If the response to the test at step (56) is negative, this is an indication that the accelerometers have determined that there has not been a change in attitude (58). However, if the response to the test at step (56) is positive, a subsequent test is conducted to determine if the laptop computer has been stationary for a long time period (60). The term stationary may support a change in inclination data that is within a defined margin of error. A positive response to the test at step (60) will result in another test to determine if the data obtained in the most recent time period is identical to data in a prior inclination data record (62). If the response to the test at step (62) is negative, the present inclination data record is registered as a stable horizontal position (64) and a test is conducted to determine there are any registered horizontal positions that have not been accessed for a long period of time (66). A positive response to the test at step (66) will support removal of the registered and unused horizontal position data (68). Accordingly, the first part of the lift determination involves determining if the computer has been in a stationary position for an extended period of time.

Figure 2B:
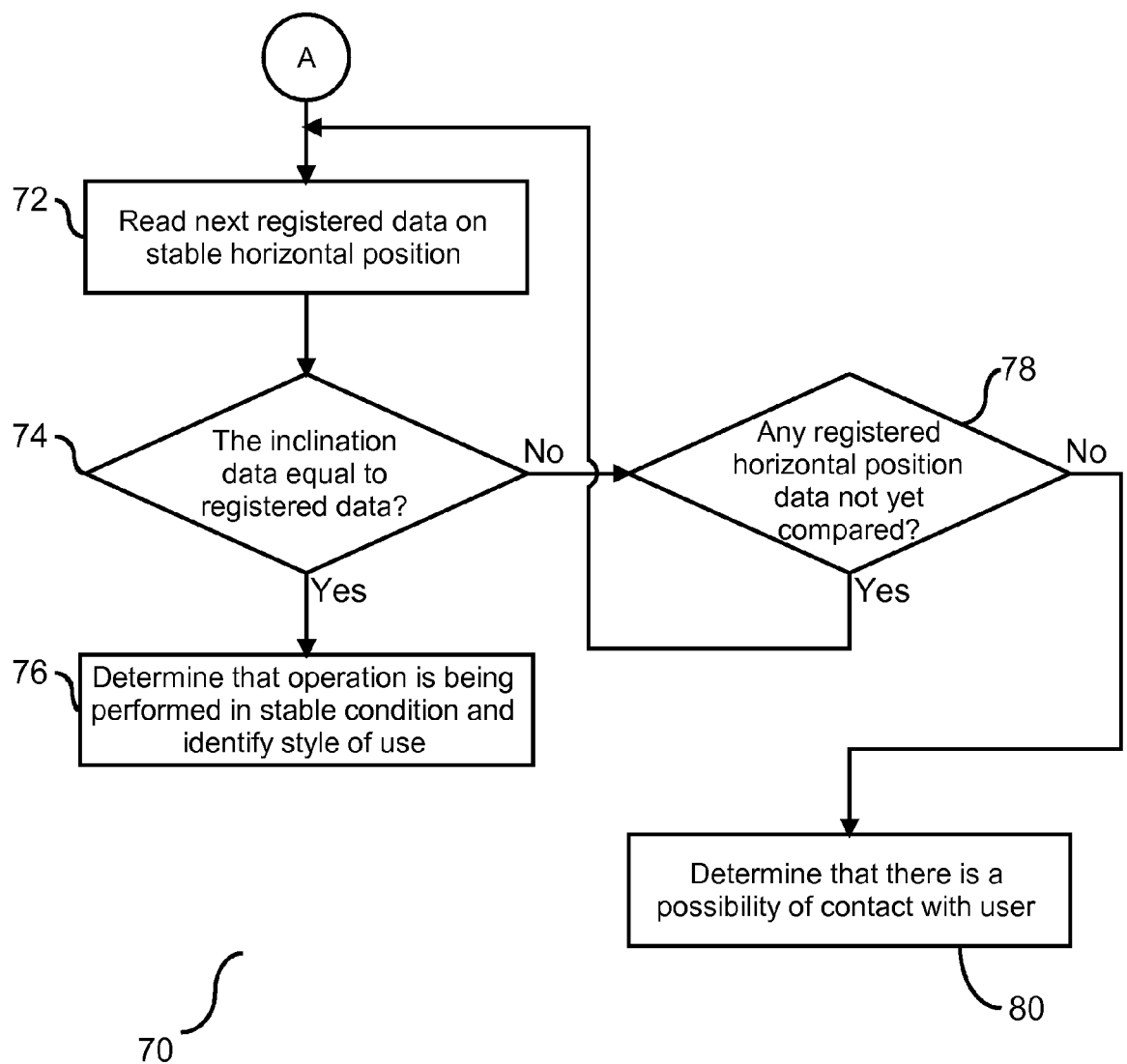

FIG. 2b is a flow chart illustrating the remaining steps of determining a lift of the computer from a stationary position. Following a negative response to the test at step (66), a positive response to the tests at steps (60) or (62), or following step (68), the next registered stable horizontal position data record is read (72) to further determine if there has been a lift of the laptop from a stationary position. Following the read at step (72), a test (74) is conducted to determine if the current inclination data obtained at step (52) is equal to the registered stable position data read at step (72). A positive response to the test at step (74) results in a determination that operation of the laptop computer is being performed in a stable condition and the style of use has been identified (76). Alternatively, a negative response to the test at step (74) will result in a subsequent test (78) to determine if there are any additional registered horizontal position data records that have not been compared to the inclination data obtained at step (52). A positive response to the test at step (78) results in a return to step (72). However, a negative response to the test at step (78) results in a determination that there is a possibility that the laptop computer has been lifted and that the thermal management mode of operation should be adjusted (80). If the time period during which variations in the inclination of the casing are monitored is excessively short, there is a possibility of an unstable attitude being erroneously detected as a stabilized attitude when the extent of variation becomes small. Occurrence of such an erroneous detection result may be prevented by adding a time period during which the measure to achieve a reduction in noise or an improvement in performance cannot be taken. Accordingly, the process of managing accelerometer data supports processing the data and comparing the data to prior readings in order to determine if there has been a significant change in attitude.

Figure 3:
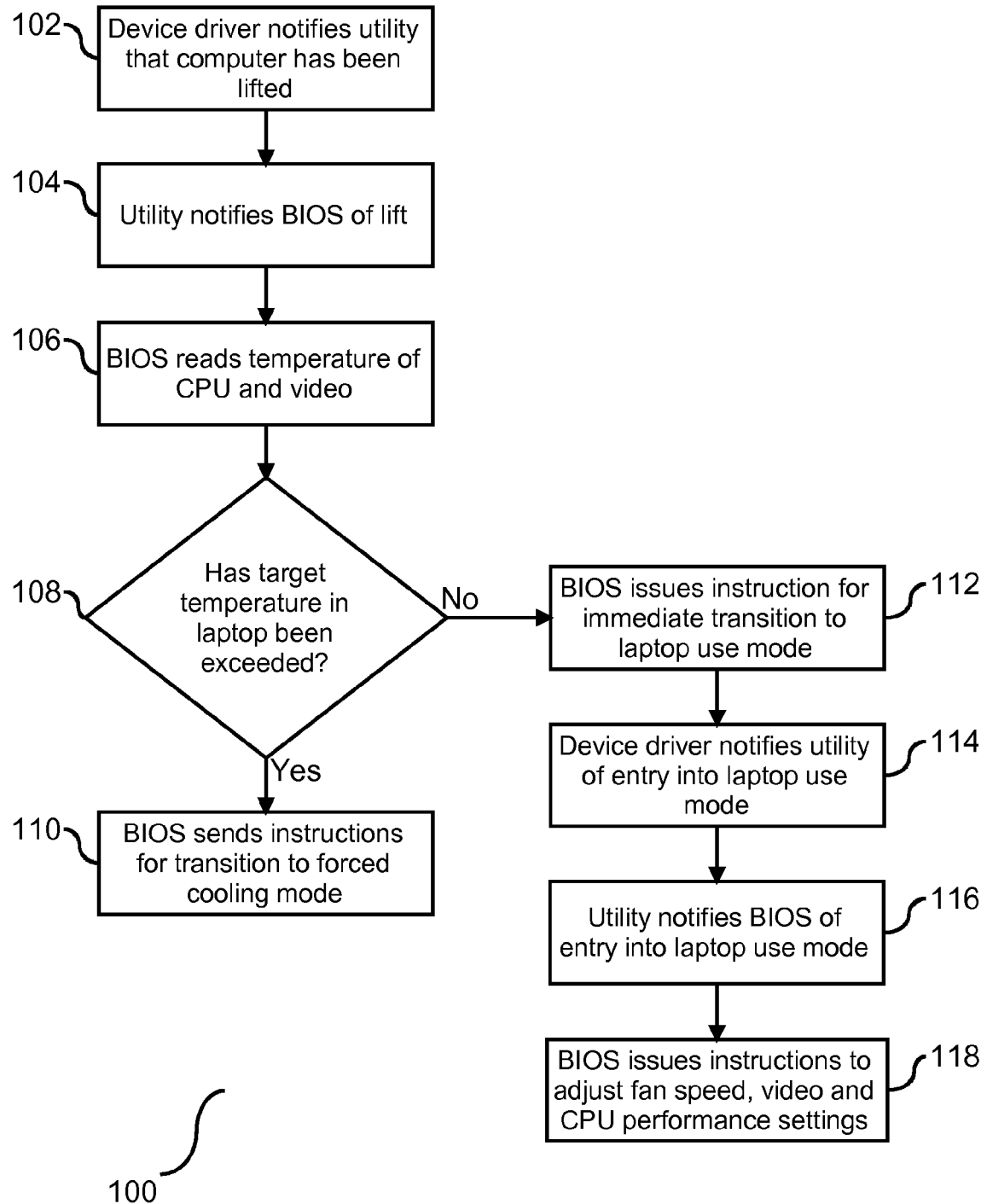
FIG. 3 is a flow chart illustrating a process of changing an operation mode of the computer in response to a lift movement.

The purpose of detecting attitude and temperature data is to accurately determine when there has been a lift of the laptop from a stationary position and to respond accordingly to prevent excess heat from being transmitted to a user from a casing surface of the computer. FIG. 3 is a flow chart (100) illustrating one embodiment for employing the thermal management of the laptop computer in response to a lift of the computer. Following a lift of the laptop, the device driver associated with attitude adjustments notifies the power manager utility that the laptop has been lifted (102), followed by the power manager utility notifying the BIOS of the movement (104). In one embodiment, the lift is determined in response to the processing of inclination data shown in FIG. 2. The BIOS reads the temperature of the processor, video card, and other heat producing electronic items in the laptop (106). Thereafter, a test is conducted to determine whether or not a target internal temperature in the laptop has been exceeded (108). The target internal temperature is a designated temperature set as a limit which if exceeded will require the thermal management system to enter into a cooling phase. If the test at step (108) indicates the target temperature has been exceeded, the BIOS sends instructions to adjust the processor clock speed and fan speed to make a transition to a forced cooling mode (110). Entry into the forced cooling mode changes the speed of an internal cooling fan and forcibly reduces the clock speed of the CPU and video. However, if the test at step (112) indicates the target temperature has not been exceeded, the BIOS issues instructions for immediate transition to a laptop use state (112). Entry into the laptop use mode requires adjustment of the speed of the cooling fan, the speed of the CPU and video to balance performance, thermal output, and noise level. Following step (112), the device driver notifies the power manager utility that the system has entered a laptop use state (114), and the power manager utility notifies the BIOS of the transition to laptop use state (116). Thereafter, the BIOS changes the cooling fan speed, as well as CPU and video performance settings (118). Accordingly, the process illustrated in this embodiment demonstrates a method for initiating entry into a forced cooling mode or a laptop use mode in response to a lift of the laptop from a stationary position.

Figure 4:
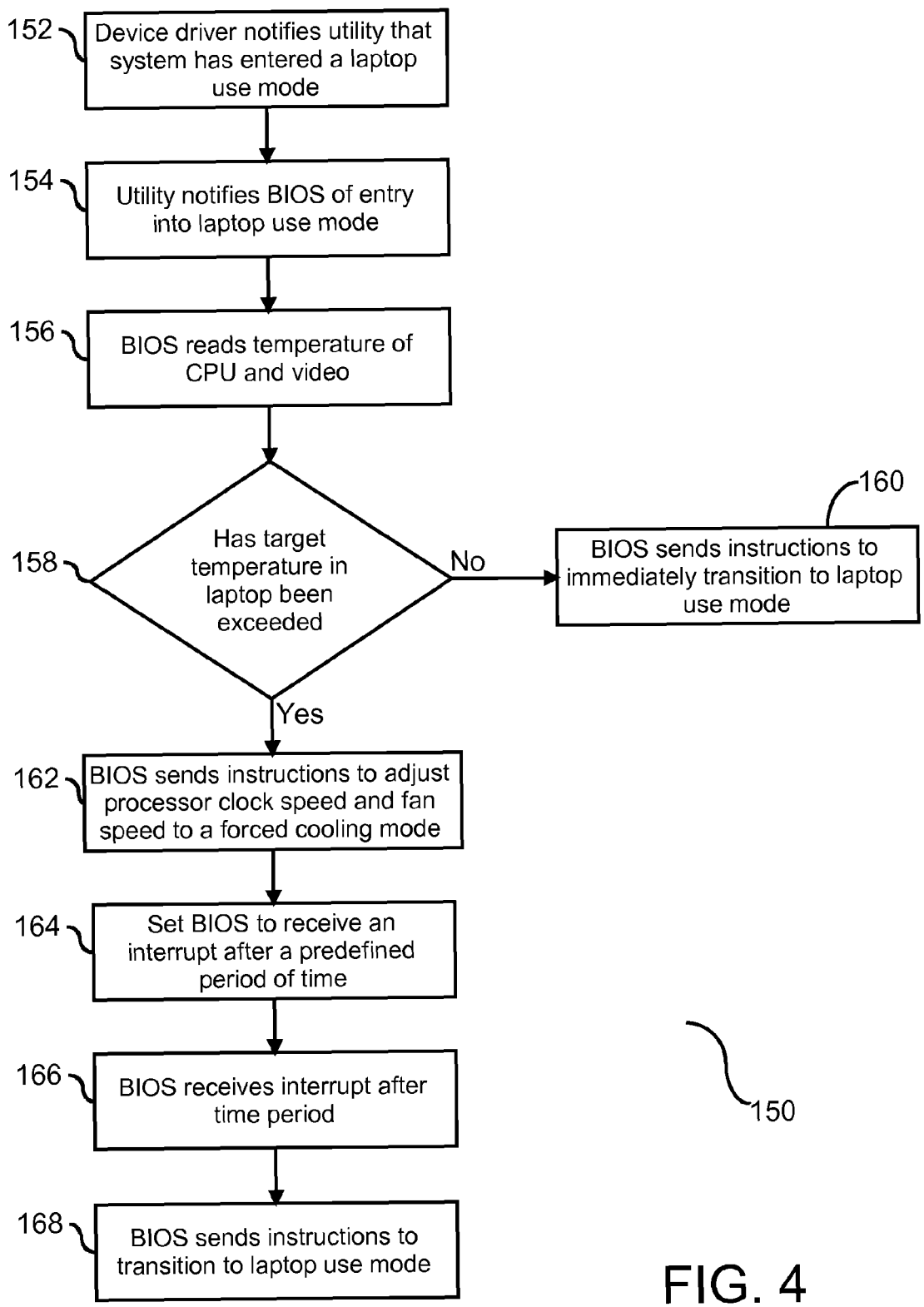
FIG. 4 is a flow chart illustrating a process of entering a rapid cooling mode for a period of time in response to entry into a laptop use state.

FIG. 4 is a flow chart (150) illustrating an embodiment for employing the rapid cooling mode for a defined period of time. Following the device driver notifying the power manager utility that the system has entered a laptop use mode (152), the power manager utility notifies the BIOS of the entry into the laptop use mode (154). The BIOS reads the temperatures of the CPU and video with use of temperature sensors (156). Thereafter, a test is conducted to determine whether or not a target internal temperature in the laptop has been exceeded (158). The target internal temperature is a designated temperature set as a limit which if exceeded will require the thermal management system to enter into a cooling phase. If the test at step (158) indicates the target temperature has been exceeded, the BIOS sends instructions to adjust the processor clock speed and fan speed to make a transition to a forced cooling mode (162). Entry into the forced cooling mode changes the speed of an internal cooling fan and forcibly reduces the clock speed of the CPU and video. However, if the test at step (158) indicates the target temperature has not been exceeded, the BIOS issues instructions to adjust the fan speed and clock speed of the CPU for immediate transition to the laptop use mode (160). Entry into the laptop use mode adjusts the speed of the cooling fan, the speed of the CPU, and video to balance performance with thermal output. Following step (162), the BIOS is set to receive an interrupt after a predefined period of time (164). In one embodiment, the predefined period of time may be about 20 seconds, although this time period may be adjusted to be increased or decreased as necessary. After the predefined period of time has lapsed, the BIOS receives an interrupt (166), which results in issuance of instructions to adjust the fan speed and clock speed of the CPU for immediate transition to the laptop use mode (168), i.e. change the cooling fan speed as well as CPU and video performance settings. Accordingly, the process illustrating in this embodiment demonstrates a method for maintaining the rapid cooling mode for a defined period of time in response to a lift movement of the laptop from a stationary position.

Figure 5:
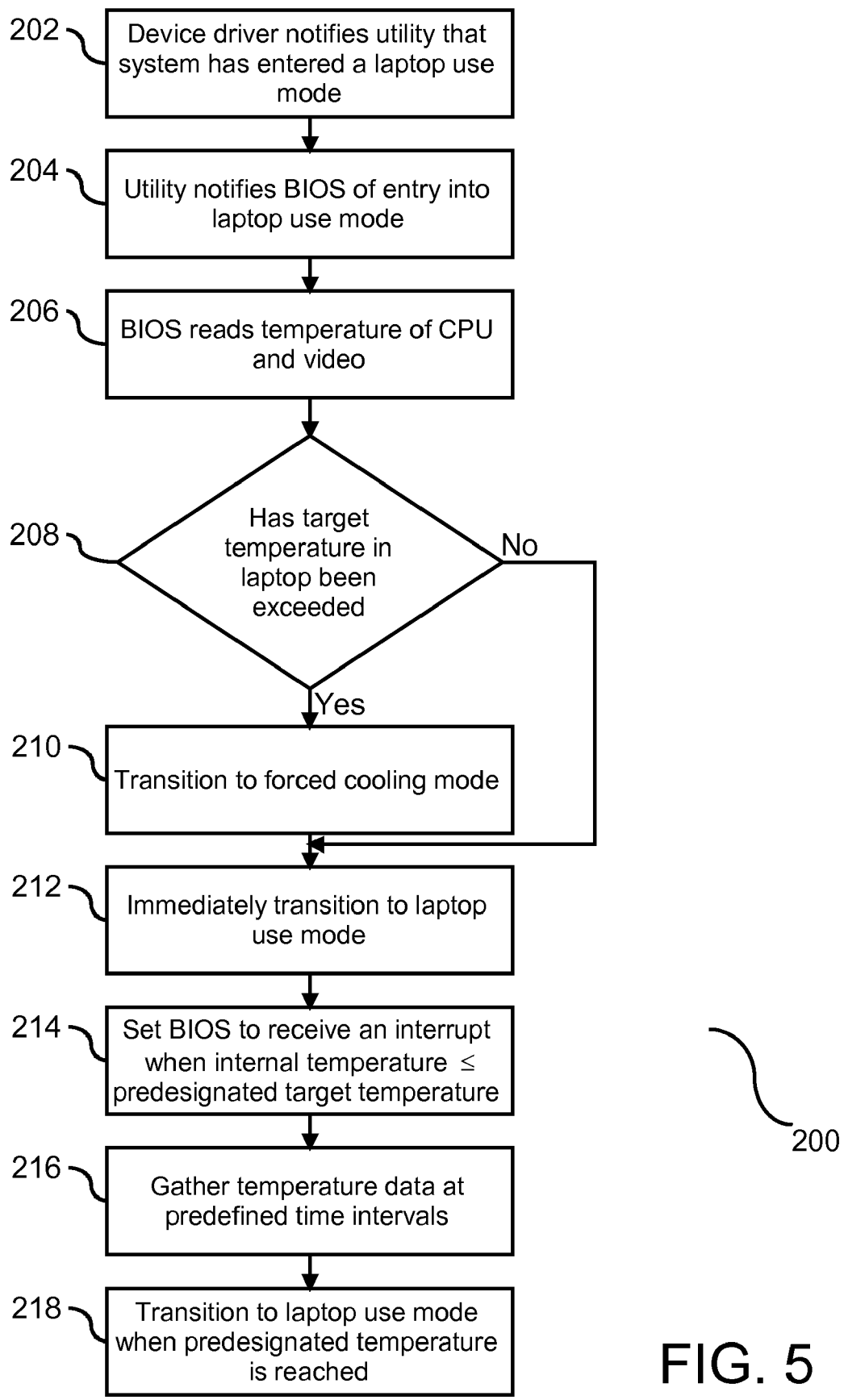
FIG. 5 is a flow chart illustrating a process of maintaining a rapid cooling mode before reduction to a target temperature.

FIG. 5 is a flow chart (200) illustrating a method for maintaining a rapid cooling mode for a defined period of time before restoration of the laptop use mode. Following the device driver notifying the power manager utility that the system has entered a laptop use mode (202), the power manager utility notifies the BIOS of the entry into the laptop use mode (204). The BIOS reads the temperatures of the CPU and video with use of temperature sensors (206). Thereafter, a test is conducted to determine whether or not a target internal temperature in the laptop has been exceeded (208). The target internal temperature is a designated temperature set as a limit which if exceeded will require the thermal management system to enter into a cooling phase. If the test at step (208) indicates the target temperature has been exceeded, the BIOS sends instructions to adjust the processor clock speed and fan speed to make a transition to a forced cooling mode (210). Entry into the forced cooling mode changes the speed of an internal cooling fan and forcibly reduces the clock speed of the CPU and video. However, if the test at step (208) indicates the target temperature has not been exceeded or the forced cooling mode has been entered at step (210), the BIOS issues instructions to adjust the fan speed and clock speed of the CPU for immediate transition to the laptop use mode (212). Entry into the laptop use mode adjusts the speed of the cooling fan, the processor clock, and video settings to balance performance with thermal output. Simultaneous with (212), the BIOS is set to receive an interrupt when the internal operating temperature becomes equal to or lower than a predesignated target temperature (214). The internal operating temperature is determined based upon the received temperature sensor data which is periodically gathered and processed at predefined time intervals (216). Such time intervals may be adjusted to be lengthened or shortened as deemed necessary to provide an optimal level of performance. When the internal operating temperature attains the predesignated target temperature, the BIOS is notified and issues instructions to adjust the fan speed and clock speed of the CPU for immediate transition to the laptop use mode (218), i.e. change the cooling fan speed as well as CPU and video performance settings. Accordingly, the process illustrating in this embodiment demonstrates a method for maintaining the rapid cooling mode for an undefined period of time until a target temperature is attained in response to a lift of the laptop from a stationary position.

There are different methods that may be employed to thermally manage operation of a computer. Such methods include employing a fan for forced air cooling, adjusting the processor clock speed, and video performance settings. In one embodiment, if the forced air cooling is the optimal tool for thermal management, the temperature at which forced air cooling is initiated may be set to accommodate adjustments of the fan speed according to the amount of generation of heat when the amount of task processing is fixed. Similarly, in another embodiment, if the adjustment of the processor speed is the optimal tool for thermal management, the temperature at which speed adjustment is initiated may be set according to the amount of heat generation in conjunction with a determination of when processing speed may be sacrificed. In addition to adjusting fan speed and the process clock, the video performance settings may also be adjusted. Each of the embodiments may be employed individually or in combination to attain a balance between an acceptable performance level and a casing surface temperature.

Advantages Over The Prior Art

A higher casing surface temperature limit can be set for use of the laptop computer on a stationary surface. This provides a reduction in noise level and improved performance associated with a higher processor speed and video performance settings when the laptop is set in on a stationary surface. However, accurate detection of a lift movement of the processor in combination with implementation of a rapid cooling mode prevents discomfort associated with placement of the laptop computer from the stationary surface to a non-stationary surface, such as the lap of the user. The rapid cooling mode is implemented for a short duration until a desired surface casing temperature is attained. During the rapid cooling mode, the noise level may increase and the processor speed and video settings may be decreased. However, at such time as the desired casing surface temperature is attained, the fan speed, the processor clock, and video performance settings may be adjusted to reduce noise level and improved performance in conjunction with maintaining a desired surface casing temperature.

Alternative Embodiments

It will be appreciated that, although specific embodiments of the invention have been described herein for purposes of illustration, various modifications may be made without departing from the spirit and scope of the invention. In particular, thermal management may be employed with a laptop computer or any other product with electronic components that have a high thermal output. Such products may include a personal digital assistant, or other categories of electronic handheld devices. Additionally, the thermal management may be employed in response to a lift movement of the computer from a stationary surface to a non-stationary surface, as well as a lift movement from a non-stationary surface to a stationary surface. Accordingly, the scope of protection of this invention is limited only by the following claims and their equivalents.

We claim:

1. A method for cooling a portable computing apparatus comprising:
    an accelerometer obtaining inclination data for the computing apparatus in predetermined time intervals over a period of time, the obtained inclination data stored in a data storage;
    defining a stable horizontal position of the computing apparatus based upon the obtained inclination data;
    determining movement of the computing apparatus from a stationary surface by comparing present inclination data with the defined stable horizontal position;
    determining if a target temperature is exceeded in response to said determined movement; and
    transitioning said computer to an alternative cooling state in response to a positive determination.

2. The method of claim 1, further comprising switching to a cooling phase of heat producing hardware in said computer in response to determining said target temperature has been exceeded.

3. The method of claim 2, wherein said cooling phase allows said target temperature to be attained in a short time interval.

4. The method of claim 3, further comprising switching to a laptop cooling state following said cooling phase operating for a predefined time interval.

5. The method of claim 1, wherein the step of transitioning said computer to an alternative cooling state includes BIOS sending instructions to adjust processor clock and fan speed.

6. The method of claim 1, further comprising switching to a laptop cooling state following an internal temperature reaching a target temperature.

7. A portable computing apparatus comprising:
    an accelerometer to sense tilt movement of said computer from a surface, including obtaining inclination data for the computer in predetermined time intervals over a certain period of time and to store the obtained inclination data in a data storage;
    a manager to define a stable horizontal position of the computer based upon the obtained inclination data;
    the manager to determine movement of the computer from a stationary surface by comparing present inclination data with the stable horizontal position;
    a sensor to determine if a target temperature is exceeded in response to said tilt movement; and
    a controller to transition said computer to an alternative cooling state in response to a positive determination.

8. The apparatus of claim 7, further comprising a switch by said controller to a laptop cooling state after an internal temperature has reached a target temperature.

9. The apparatus of claim 7, further comprising a manager to switch heat producing hardware in said computer to a cooling phase in response to a determination that said target temperature has been exceeded.

10. The apparatus of claim 9, wherein said manager is in communication with BIOS to send instructions to adjust processor clock and fan speed to transition to said cooling phase.

11. The apparatus of claim 10, wherein said processor clock and fan speed adjustment reduces performance of the processor and video.

12. The apparatus of claim 11, further comprising a switch by said controller to a laptop cooling state after operation of said cooling phase for a predefined time interval.

13. An article comprising:
    means for detecting input to an accelerometer associated with movement of a computer from a stationary surface, including obtaining inclination data for the computer in predetermined time intervals over a period of time and storing the obtained inclination data in a data storage;
    means for defining a stable horizontal position of the computer based upon the obtained inclination data;
    means for determining movement of the computer from a stationary surface by comparing present inclination data with the stable horizontal position;
    means for determining if a target temperature is exceeded in response to said movement; and
    means for transitioning said computer to an alternative cooling state in response to a positive determination.

14. The article of claim 13, further comprising means for switching to a cooling phase of heat producing hardware in said computer in response to said target temperature determination means.

15. The article of claim 14, wherein said means for switching to a cooling phase includes BIOS sending instructions to adjust hardware elements with heat byproduct.

16. The article of claim 15, wherein said hardware elements are selected from the group consisting of: processor clock and fan speed.

17. The article of claim 15, further comprising means for switching to a cooling state following said cooling phase operating for a predefined time interval.

18. The article of claim 13, further comprising means for switching to a cooling state following an internal temperature reaching a target temperature.

* * * * *